United States Patent
Kim et al.

(10) Patent No.: US 8,155,631 B2
(45) Date of Patent: Apr. 10, 2012

(54) MULTICHANNEL SCANNING APPARATUS AND METHOD FOR DUAL DMB-ENABLED MOBILE PHONE

(75) Inventors: Ki Tae Kim, Gumi-si (KR); Soon Jin Kim, Daegu Metropolitan (KR); Jae Gon Son, Daegu Metropolitan (KR)

(73) Assignee: Samsung Electronics Co., Ltd (KR)

( * ) Notice: Subject to any disclaimer, the term of this patent is extended or adjusted under 35 U.S.C. 154(b) by 859 days.

(21) Appl. No.: 11/726,179

(22) Filed: Mar. 20, 2007

(65) Prior Publication Data

US 2007/0287435 A1    Dec. 13, 2007

(30) Foreign Application Priority Data

Jun. 8, 2006    (KR) .................. 10-2006-0051584

(51) Int. Cl.
*H04M 3/42*    (2006.01)

(52) U.S. Cl. .................. 455/414.2; 455/3.01; 455/466; 455/566; 455/455; 455/434

(58) Field of Classification Search .................. 455/3.01, 455/434, 466, 566
See application file for complete search history.

(56) References Cited

U.S. PATENT DOCUMENTS

| | | | | |
|---|---|---|---|---|
| 2003/0030613 | A1* | 2/2003 | Chae | 345/89 |
| 2004/0204020 | A1* | 10/2004 | Kuramitsu | 455/550.1 |
| 2004/0221306 | A1* | 11/2004 | Noh | 725/44 |
| 2005/0070327 | A1 | 3/2005 | Watanabe | |
| 2005/0080764 | A1* | 4/2005 | Ito | 707/1 |
| 2005/0128366 | A1 | 6/2005 | Cha | |
| 2005/0140790 | A1 | 6/2005 | Min et al. | |
| 2005/0261033 | A1* | 11/2005 | Wang | 455/566 |
| 2005/0265484 | A1 | 12/2005 | Kim et al. | |
| 2006/0052052 | A1* | 3/2006 | Jung et al. | 455/3.01 |
| 2006/0114363 | A1* | 6/2006 | Kang et al. | 348/838 |
| 2006/0233373 | A1* | 10/2006 | Kang | 380/257 |
| 2008/0240681 | A1* | 10/2008 | Fukushima | 386/96 |

FOREIGN PATENT DOCUMENTS

| | | |
|---|---|---|
| CN | 1622476 | 6/2005 |
| EP | 1 596 513 | 11/2005 |
| EP | 1596513 A2 * | 11/2005 |
| EP | 1 827 010 | 8/2007 |
| JP | 05-075949 | 3/1993 |
| JP | 2005159615 A * | 6/2005 |
| WO | WO 2005/076503 | 8/2005 |
| WO | WO 2005076503 A1 * | 8/2005 |

* cited by examiner

*Primary Examiner* — Jinsong Hu
*Assistant Examiner* — Qun Shen
(74) *Attorney, Agent, or Firm* — The Farrell Law Firm, P.C.

(57) ABSTRACT

A multichannel scanning apparatus and method for a DMB-enabled mobile phone that are capable of simultaneously displaying multiple images received through different service channels of satellite and terrestrial digital multimedia broadcasting systems is provided. A multichannel scanning method of the present invention includes determining functionalities of first and second broadcast systems; setting multi picture presentation function for displaying at least two broadcast channels of the first and second broadcast systems on a screen; and simultaneously displaying one of the broadcast channel as a main channel picture and at least one of the broadcast channels excluding the main channel as a sub channel picture.

8 Claims, 3 Drawing Sheets

MULTICHANNEL SCANNING APPARATUS AND METHOD FOR DUAL DMB-ENABLED MOBILE PHONE

PRIORITY

This application claims priority to an application entitled "MULTICHANNEL SCANNING APPARATUS AND METHOD FOR DUAL DMB-ENABLED MOBILE PHONE" filed in the Korean Intellectual Property Office on Jun. 8, 2006 and assigned Serial No. 2006-0051584, the contents of which are incorporated herein by reference.

BACKGROUND OF THE INVENTION

1. Field of the Invention

The present invention relates to a digital multimedia broadcasting (DMB)-enabled mobile phone and, in particular, to a multichannel scanning apparatus and method for a DMB-enabled mobile phone that is capable of simultaneously displaying multiple pictures received through different service channels of a satellite and a terrestrial DMB system in Picture-in-Picture (PIP) presentation.

2. Description of the Related Art

DMB is a digital transmission system for delivering multimedia content and services on the move. DMB is based on the Digital Audio Broadcasting (DAB) standard, which is modified for transmitting digital audio, video, and multimedia streaming for mobile DMB receivers. DMB enables people on the road to enjoy crystal-clear video, compact disc (CD) quality of audio, and data via DMB exclusive terminals or hand-held devices such as mobile telephones. DMB services can be provided with a plurality of video and audio channels and can be received by the DMB receivers having a non-directional antenna.

There are two types of DMB: Terrestrial DMB (T-DMB) and Satellite DMB (S-DMB). Both T-DMB and S-DMB are roughly equal in terms of their mobile reception of multimedia broadcasts. The difference between them is that T-DMB works on networks built only through terrestrial broadcast stations, while S-bMB utilizes networks built with satellites and gap fillers, which provide in-building coverage. Another difference is that T-DMB is allocated with a Very High Frequency (VHF) band, while S-DMB is allocated with an Ultra High Frequency (UHF) band (2.6 to 2.655 GHz).

Recently, dual DMB phones supporting both S-DMB and T-DMB have been developed. However, the conventional dual DMB phones cannot allow viewing S-DMB and T-DMB channels at the same.

SUMMARY OF THE INVENTION

The present invention has been made in an effort to solve the above problems, and it is an aspect of the present invention to provide a multichannel scanning apparatus and method for a DMB-enabled mobile phone that is capable of simultaneously displaying multiple images received on service channels of T-DMB and S-DMB systems.

It is another aspect of the present invention to provide a multichannel scanning apparatus and method for a DMB-enabled mobile phone that is capable of simultaneously displaying multiple images received on multiple channels of one of T-DMB and S-DMB systems.

It is another aspect of the present invention to provide a multichannel scanning apparatus and method for a DMB-enabled mobile phone that is capable of simultaneously displaying multiple images of T-DMB and S-DMB channels as a main picture and at least one sub picture of PIP function.

In accordance with an aspect of the present invention, the above and other aspects are accomplished by a multichannel scanning method for a dual broadcast system-enabled mobile phone. The multichannel scanning method includes checking functionalities of first and second broadcast systems; setting a multi picture presentation function for displaying on a screen at least two broadcast channels of the first and second broadcast systems; and simultaneously presenting one of the broadcast channels as a main channel picture and at least one of the broadcast channels excluding the main channel as a sub channel picture.

In accordance with another aspect of the present invention, the above and other aspects are accomplished by a multichannel scanning apparatus for a dual broadcast system-enabled mobile phone. The multichannel scanning apparatus includes an operation monitor for monitoring operations of first and second broadcast systems; a multi picture presentation setter for setting a simultaneous presentation of multiple pictures on a screen; and a display for simultaneously presenting one of the broadcast channels as a main channel picture and at least one of the broadcast channels excluding the main channel as a sub channel picture.

In accordance with another aspect of the present invention, the above and other aspects are accomplished by a multichannel scanning apparatus for a dual digital multimedia broadcasting (DMB) enabled mobile phone. The multichannel scanning apparatus includes a satellite DMB (S-DMB) receiver for receiving S-DMB channels; a terrestrial DMB (T-DMB) receiver for receiving T-DMB channels; an audio processing unit for processing audio signals of the S-DMB and T-DMB channels; a display for displaying multiple DMB channel pictures; a video processing unit for processing the multiple DMB channels so as to output main and sub pictures as Picture-in-Picture (PIP); and a controller for controlling cooperation of the S-DMB and T-DMB receiver, audio processing unit, and video processing unit for simultaneously displaying the main and sub pictures on the display.

In accordance with another aspect of the present invention, the above and other aspects are accomplished by a multichannel scanning method for a dual digital multimedia broadcasting (DMB)-enabled mobile phone supporting satellite DMB (S-DMB) and terrestrial DMB (T-DMB). The multichannel scanning method includes determining whether main and sub channels are set; if main and sub channels are not set, selecting a main channel and at least one sub channel from among S-DMB and T-DMB channels for main and sub channel pictures; displaying the main and sub channel pictures by establishing a TV out signal; determining whether an incoming call is received while displaying the main and sub channels; if an incoming call is received, presenting incoming call related information as the main channel picture; and presenting the main channel as the sub channel picture.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Preferred embodiments of the present invention are described with reference to the accompanying drawings in detail. The same reference numbers are used throughout the drawings to refer to the same or like parts. Detailed descriptions of well-know functions and structures incorporated herein may be omitted to avoid obscuring the subject matter of the present invention.

Figure 1:
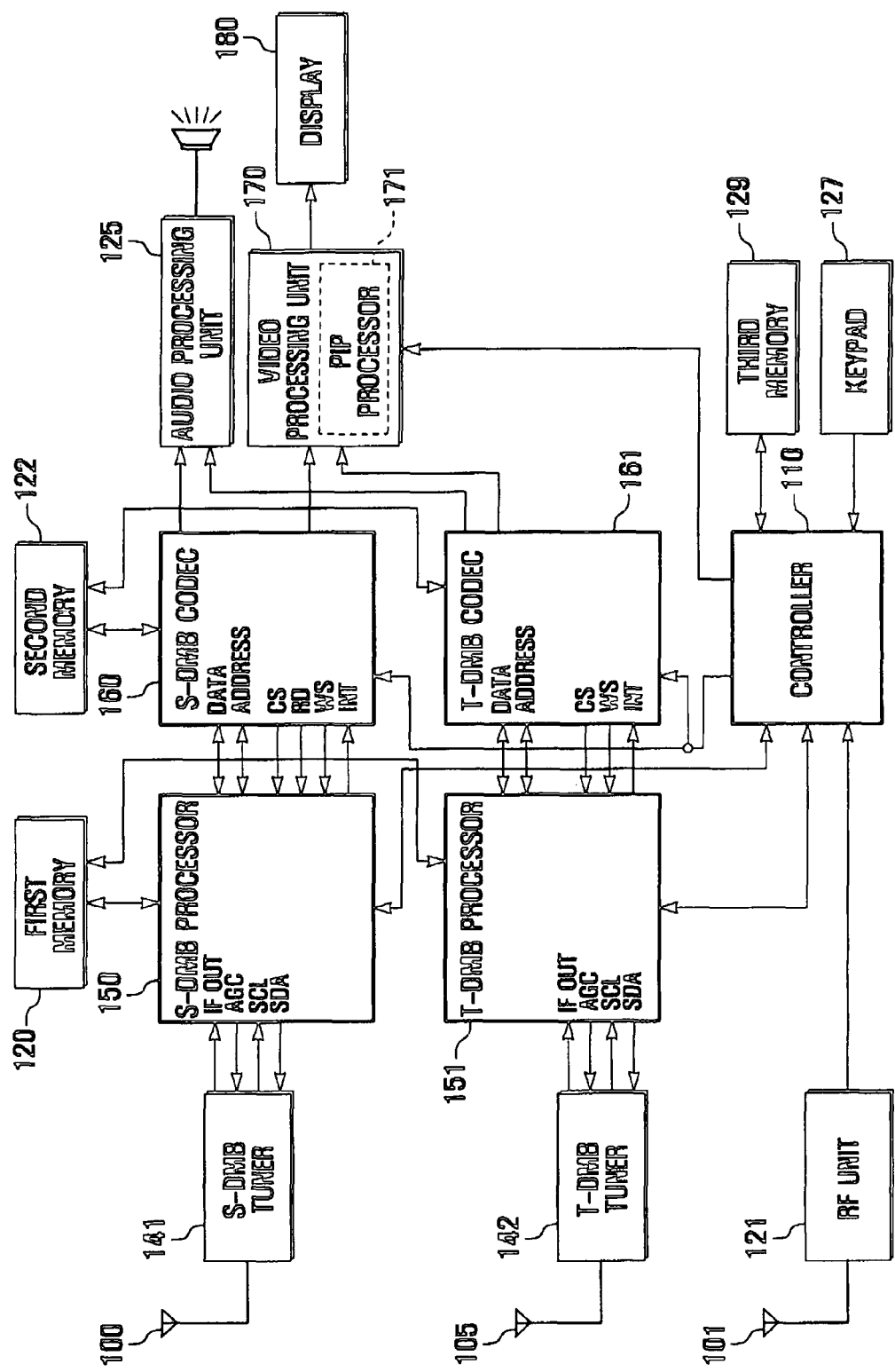
FIG. 1 is a block diagram illustrating a configuration of a DMB-enabled mobile phone according to the present invention.

FIG. 1 is a block diagram illustrating a configuration of a DMB-enabled mobile phone according to the present invention.

Referring to FIG. 1, the DMB-enabled mobile phone according to the present invention performs communication by means of a radio frequency (RF) unit 121 through a radio antenna 101. An S-DMB antenna 100 is implemented to receive broadcast signals in S-DMB band and a T-DMB antenna 105 is implemented to receive broadcast signals in T-DMB band.

The DMB-enabled mobile phone includes an S-DMB part and a T-DMB part.

The S-DMB part includes an S-DMB tuner 141, an S-DMB processor 150, and an S-DMB codec 160.

The S-DMB tuner 141 allows S-DMB signals of a plurality of S-DMB channels to be received through the S-DMB antenna 100 and performs frequency conversion of the S-DMB signals. The S-DMB tuner 141 can be implemented by an integrated circuit (IC) for down-converting the S-DMB signal to an intermediate frequency signal.

The S-DMB processor 150 performs demodulation and decoding on the S-DMB signals. The received S-DMB signals are decoded by channel and the decoded S-DMB signal is stored in a first memory 120.

The S-DMB codec 160 decodes video and audio signals separately output from the S-DMB processor 150 under the control of a controller 110.

The decoded audio signals output from the S-DMB codec 160 are processed by an audio processing unit 125 to be output through a speaker, and the decoded video signal output from the S-DMB codec 160 are processed by a video processing unit 170 to be output through a display 180.

In this embodiment, the video processing unit 170 includes a PIP processor 171 which processes S-DMB video signals received through multiple channels to be simultaneously displayed as multiple pictures or a main picture and at least one sub picture, in a PIP function, on the display 180. The audio processing unit 125 selectively outputs the audio signal associated with one of the main and sub channels.

The T-DMB part includes a T-DMB tuner 142, a T-DMB-processor 151, and a T-DMB codec 161.

The T-DMB tuner 142 allows T-DMB signals of a plurality of T-DMB channels to be received through the T-DMB antenna 105 and performs frequency conversion of the T-DMB signals. The T-DMB tuner 142 can be implemented by an IC for down-converting a T-DMB signal to an intermediate frequency signal of 38 MHz or 2 MHz frequency band.

The T-DMB processor 151 performs demodulation and decoding on the T-DMB signals and stores the decoded T-DMB signals in the first memory 120 under the control of the controller 110.

The T-DMB codec 161 decodes video and audio signals separately output from the T-DMB processor 151 under the control of the controller 110.

The T-DMB video signals can be processed by the PIP processor 171 of the video processing unit 170 so as to be output as a main or sub picture of a PIP together with audio sound output from audio processing unit 125.

A keypad 127 is provided with function keys for enabling a multi picture mode or PIP mode and selecting channels for main and sub pictures.

Figure 2:
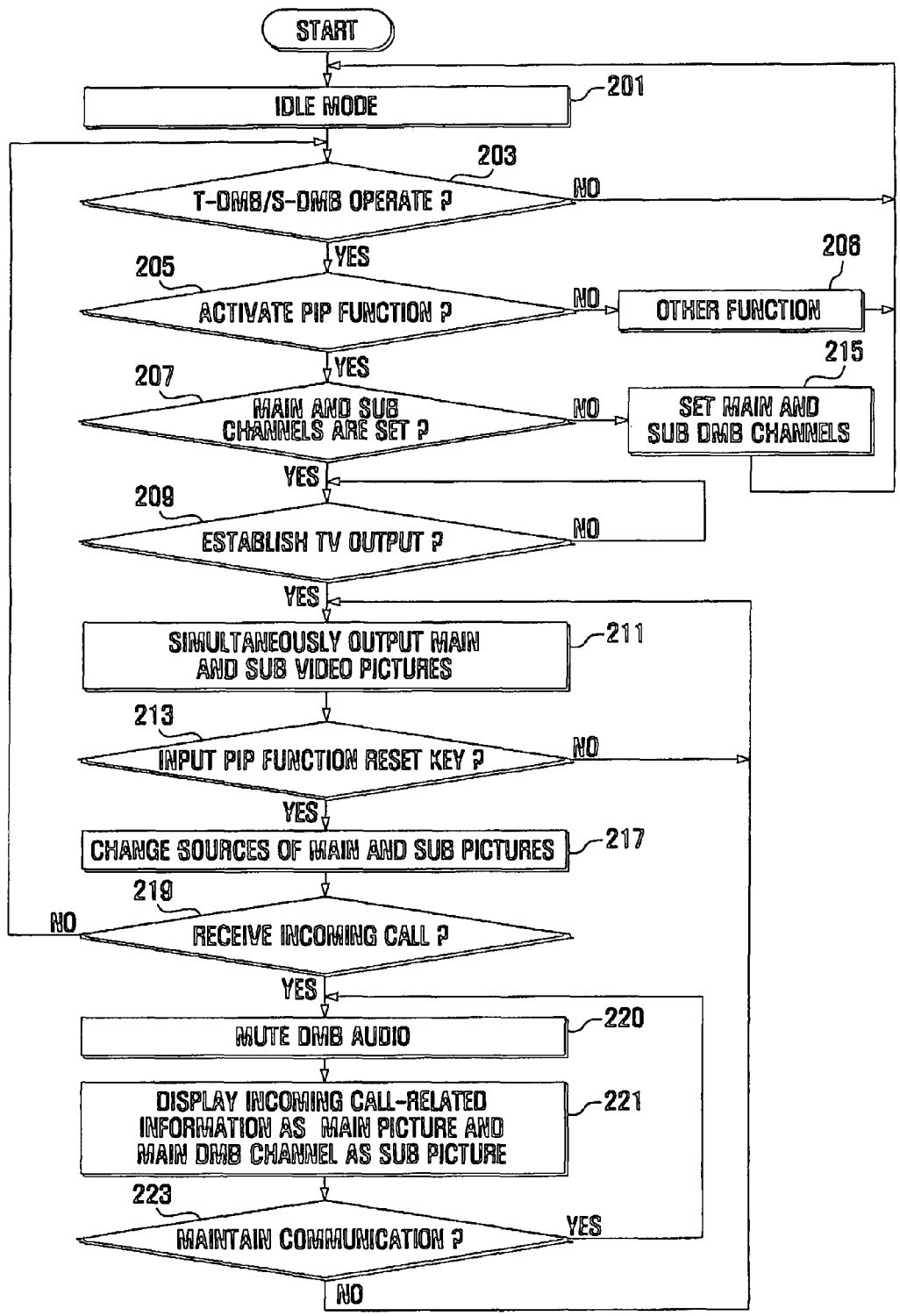
FIG. 2 is a flowchart illustrating a dual DMB multichannel scanning procedure of a multichannel scanning method according to the present invention.
Figure 3:
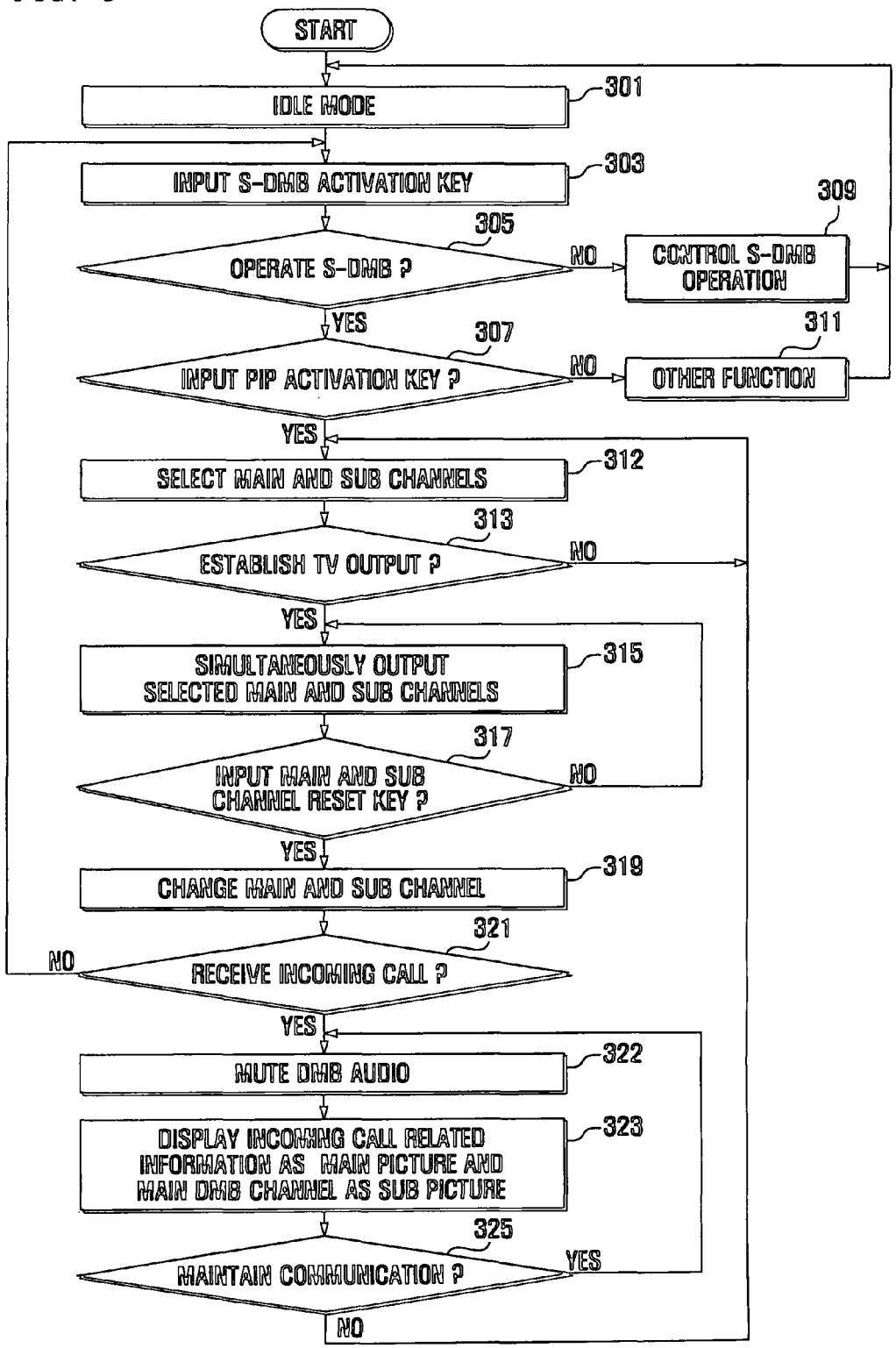
FIG. 3 is a flowchart illustrating a single DMB multichannel scanning, procedure of a multichannel scanning method according the present invention.

FIG. 2 is a flowchart illustrating a dual DMB multichannel scanning procedure of a multichannel scanning method according to the present invention, and FIG. 3 is a flowchart illustrating a single DMB multichannel scanning procedure of a multichannel scanning method according to the present invention.

Dual DMB (S-DMB and T-DMB) PIP Mode

Referring to FIGS. 1 and 2, in an idle mode (S201), the controller 110 determines whether the T-DMB or the S-DMB operates in a normal operation state (S203). In the normal operation state, the S-DMB tuner 141 and the T-DMB tuner 142 receive the broadcast signals through the S-DMB and T-DMB antennas 100 and 105, and the S-DMB and T-DMB processors 150 and 151 perform demodulation and decoding of the S-DMB and T-DMB signals output from the S-DMB and T-DMB tuners 141 and 142. The decoded S-DMB and T-DMB signals are stored in the first memory 120 and separately decoded by the S-DMB and T-DMB codecs 160 and 161 so as to be output as video and audio signals. The S-DMB and T-DMB video and audio signals are stored in a second memory 122. The S-DMB and T-DMB audio signals are processed by the audio processing unit 125 so as to be output through the speaker, and the S-DMB and T-DMB video signals are processed by the video processing unit 170 so as to be output through the display 180.

If the T-DMB and S-DMB operate in the normal operation state, the controller 110 determines whether a key is input from the keypad 127 for activating a multi picture presentation or PIP function (S205). If a multi image presentation or PIP function activation key is input, the controller 110 determines whether the PIP processor 171 of the video processing unit 170 has a setting on the main and sub DMBs (S207). If the PIP processor 171 does not have a setting on the main and sub DMBs, the controller 110 controls to set main and sub DMBs (S215). If the S-DMB is selected as the main DMB, the T-DMB becomes the sub DMB. Of course, the sources of the main and sub DMB can be changed. If the PIP processor 171 has a setting on the main and sub DMBs, the controller determines whether a TV out is established (S209). If the TV out is established, the controller 110 controls such that the PIP processor 171 of the video processing unit 170 outputs the T-DMB video signal for the main picture and the S-DMB video signal for the sub picture, or vice versa (S211). While displaying the main and sub picture on the display, the controller 110 determines whether a key is input for resetting PIP function (S213). If a key is input for resetting the PIP function, the controller 110 changes the sources of the main and sub pictures (S217).

The controller 110 determines whether an incoming call is detected through the RF unit 121 while processing the S-DMB and T-DMB signals (S219). If an incoming call is detected, the controller 110 mutes the DMB audio sound (S220) and displays incoming call-related information as the main picture window and display the main DMB channel as the sub picture (S221). Next, the controller 110 determines whether a call termination is detected (S223). If a call termination is not detected, the controller 110 returns to step S220. If a call termination is detected, the controller 110 returns to step S211

Single DMB multichannel PIP mode

Referring to FIGS. 1 and 3, in an idle mode (S301), the controller 110 detects a key input for activating an S-DMB (S303). If an S-DMB activation key is input, the controller 110 determines whether the S-DMB operates in a normal operation state (S305). In the normal operation state, the S-DMB tuner 141 receives the S-DMB signals through the S-DMB antenna 100, and the S-DMB processor 150 performs demodulation and decoding on the S-DMB signals output from the S-DMB tuner 141. The decoded S-DMB signals are stored in the first memory 120 and separately decoded by the S-DMB codec 160 so as to be output as S-DMB video and audio signals. The S-DMB audio signals are processed by the audio processing unit 125 so as to be output through the speaker, and the S-DMB video signals are processed by the video processing unit 170 so as to be output through the display 180. If the S-DMB operates in the normal operation state, the controller 110 determines whether a key is input from a key pad for activating a multi picture presentation or PIP function (S307). If a PIP function activation key is input, the controller 110 determines whether the PIP processor 171 of the video processing unit 170 enables setting a main channel and at least one sub channel of the S-DMB system (S312). Next, the controller 110 determines whether a TV out is established (S313). If the TV out is established, the controller 110 controls such that the PIP processor 171 outputs the main and sub channel video signals on the display as main and sub pictures, respectively (S315). For example, an MBC S-DMB channel is displayed as the sub picture while a KBS S-DMB channel is displayed as a main picture on the display. The channels for either or both of the main and sub pictures can be changed.

While displaying the main and sub pictures, the controller 110 determines whether a key is input for resetting the PIP channels (S317). If a PIP channel reset key is input, the controller 110 changes the main and sub channels according to user selection signals (S319).

Next, the controller 110 determines whether an incoming call is detected through the RF unit 121 while processing the S-DMB channel signals in a PIP mode (S321). If an incoming call is detected, the controller 110 mutes the DMB audio sound (S322) and displays incoming call-related information as the main picture while maintaining presentation of the sub picture (S323). Next, the controller 110 determines whether a call termination is detected (S325). If a call termination is detected, the controller 110 returns to step S312. If a call termination is not detected, the controller 110 returns to step S322.

Although example embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

As described above, a multichannel scanning apparatus and method for a dual DMB-enabled mobile phone enable allows users to simultaneously view S-DMB and T-DMB channels. Also, a multichannel scanning apparatus and method for a dual DMB-enable mobile phone allows users to simultaneously view at least two channels of one of S-DMB and T-DMB system.

What is claimed is:

1. A multichannel scanning method for a dual broadcast system-enabled mobile phone, comprising:
    determining whether broadcast signals for a terrestrial Digital Multimedia Broadcasting (DMB) system and a satellite DMB system are simultaneously received;
    determining whether a key input is entered activating a multi picture presentation function, when the broadcast signals for the terrestrial DMB system and the satellite DMB system are simultaneously received;
    setting the multi picture presentation function for simultaneously displaying a broadcast channel of the terrestrial DMB system and a broadcast channel of the satellite DMB system on a display, when the key input is entered activating the multi picture presentation function;
    simultaneously displaying the broadcast channel of the terrestrial DMB system as one of a main channel picture and a sub channel picture and the broadcast channel of the satellite DMB system as a remaining main channel picture or sub channel picture according to a user's display setting;
    determining if an incoming call is received while displaying the main and sub channel pictures;
    if an incoming call is received, displaying incoming call-related information as the main channel picture; and
    displaying the main channel as the sub channel picture.

2. The multichannel scanning method of claim 1, further comprising configuring sizes and positions of the main and sub channel pictures on the display.

3. A multichannel scanning apparatus for a dual broadcast system-enabled mobile phone, comprising:
    a controller for determining whether broadcast signals for a terrestrial Digital Multimedia Broadcasting (DMB) system and a satellite DMB system are simultaneously received, and determining whether a key input is entered activating a multi picture presentation function, when the broadcast signals for the terrestrial DMB system and the satellite DMB system are simultaneously received;
    a multi picture presentation unit for setting a simultaneous display of multiple pictures on a screen, when the key input is entered activating the multi picture presentation function; and
    a display for simultaneously displaying a broadcast channel of the terrestrial DMB system as one of a main channel picture and a sub channel picture and the broadcast channel of the satellite DMB system as a remaining main channel picture or sub channel picture according to a user's display setting,
    wherein it is determined if an incoming call is received while displaying the main and sub channel pictures;
    if an incoming call is received, incoming call-related information is displayed as the main channel picture; and
    the main channel is displayed as the sub channel picture.

4. A multichannel scanning apparatus for a dual Digital Multimedia Broadcasting (DMB) enabled mobile phone, comprising:
    a Satellite DMB (S-DMB) receiver for receiving S-DMB channels;
    a Terrestrial DMB (T-DMB) receiver for receiving T-DMB channels;
    an audio processing unit for processing audio signals of the S-DMB and T-DMB channels;
    a controller for determining whether broadcast signals for a T-DMB system and a S-DMB system are simultaneously received, and determining whether a key input is entered activating a multi picture presentation function, when the broadcast signals for the T-DMB system and the S-DMB system are simultaneously received;

a display for simultaneously displaying multiple DMB channel pictures comprising at least one S-DMB channel and at least one T-DMB channel, when the key input is entered activating the multi picture presentation function;

a video processing unit for processing the multiple DMB channels to output main and sub pictures of a Picture-in-Picture (PIP) format; and a controller for controlling the S-DMB and T-DMB receivers, audio processing unit, and video processing unit for simultaneously displaying a main and sub pictures on the display, wherein it is determined if an incoming call is received while displaying the main and sub channel pictures;

if an incoming call is received, incoming call-related information is displayed as the main channel picture; and the main channel is displayed as the sub channel picture.

5. The multichannel scanning apparatus of claim 4, wherein the S-DMB receiver comprises an S-DMB tuner, an S-DMB processor, and an S-DMB codec.

6. The multichannel scanning apparatus of claim 4, wherein the T-DMB receiver comprises a T-DMB tuner, a T-DMB processor, and a T-DMB codec.

7. A multichannel scanning method for a dual Digital Multimedia Broadcasting (DMB)-enabled mobile phone supporting Satellite DMB (S-DMB) and Terrestrial DMB (T-DMB), comprising:

determining whether broadcast signals for a T-DMB system and a S-DMB system are simultaneously received;

determining whether a key input is entered activating a multi picture presentation function, when the broadcast signals for the T-DMB system and the S-DMB system are simultaneously received;

determining if main and sub channels are set, when the key input is entered activating the multi picture presentation function;

if main and sub channels are not set, selecting a main channel and a sub channel from among an S-DMB channel and a T-DMB channel for main and sub channel pictures;

simultaneously displaying the main and sub channel pictures by establishing a TV out;

determining if an incoming call is received while displaying the main and sub channels;

if an incoming call is received, presenting incoming call related information as the main channel picture; and presenting the main channel as the sub channel picture.

8. The multichannel scanning method of claim 7, further comprising:

determining if a channel reset signal is input while displaying the main and sub channel pictures; and if a channel reset signal is input, enabling the main and sub channels to be changed.

* * * * *